(12) United States Patent
Renda

(10) Patent No.: US 7,327,486 B2
(45) Date of Patent: Feb. 5, 2008

(54) PRINTING DEVICE WITH READER FOR REMOVABLE MEDIA STORAGE CONTAINER

(75) Inventor: Arthur A Renda, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1004 days.

(21) Appl. No.: 09/938,711

(22) Filed: Aug. 23, 2001

(65) Prior Publication Data

US 2003/0038971 A1 Feb. 27, 2003

(51) Int. Cl.
*B41J 1/00* (2006.01)
*G06F 15/00* (2006.01)

(52) U.S. Cl. ............ 358/1.16; 358/1.15; 399/81; 707/1; 709/217; 709/219; 709/238

(58) Field of Classification Search ........... 358/1.16, 358/1.15; 700/94; 711/115; 704/500, 501, 704/270; 707/1; 709/217, 219, 238; 399/81
See application file for complete search history.

(56) References Cited

U.S. PATENT DOCUMENTS

| | | | | |
|---|---|---|---|---|
| 5,604,844 A | * | 2/1997 | Nishiyama | 358/1.12 |
| 5,624,265 A | * | 4/1997 | Redford et al. | 434/307 R |
| 5,752,075 A | * | 5/1998 | Kikinis | 710/1 |
| 6,378,070 B1 | * | 4/2002 | Chan et al. | 713/155 |
| 6,452,874 B1 | * | 9/2002 | Otsuka et al. | 369/14 |
| 6,651,149 B1 | * | 11/2003 | Iwasaki | 711/163 |
| 6,834,308 B1 | * | 12/2004 | Ikezoye et al. | 709/231 |
| 6,865,431 B1 | * | 3/2005 | Hirota et al. | 700/94 |
| 2001/0017701 A1 | * | 8/2001 | Ito et al. | 358/1.1 |
| 2001/0040698 A1 | * | 11/2001 | Maeda et al. | 358/1.16 |
| 2002/0110073 A1 | * | 8/2002 | Shu et al. | 369/99 |
| 2002/0165797 A1 | * | 11/2002 | Deitrickson | 705/26 |

* cited by examiner

*Primary Examiner*—Aung S. Moe
*Assistant Examiner*—Peter K. Huntsinger (57) ABSTRACT

A printer has a removable media storage container reader and detects data in a file in a memory of a removable media storage container. The printer is capable of printing a report of the data upon detection without a user intervention.

17 Claims, 5 Drawing Sheets

Fig. 6

PRINTING DEVICE WITH READER FOR REMOVABLE MEDIA STORAGE CONTAINER

FIELD OF THE INVENTION

This invention relates to a printing device, and particularly to audio visual (AV) storage reporting by a printer with a reader for a removable container having AV media storage thereon.

BACKGROUND OF THE INVENTION

In the early 90's, the rapid growth of mobile computing drove the development of smaller, lighter, and more portable tools for information processing, particularly for storing data. One of these innovations was removable containers having magnetically stored media thereon, such as the Personal Computer memory Card (PC Card) technology. The power and versatility of PC Cards to store digital audio data made them standard equipment in mobile electronic devices, such as digital cameras and digital audio players.

Digital audio files are stored in a variety of formats using different audio encoding algorithms that are used to digitally encode and compress music into encoded audio formats at near Compact Disk (CD) quality. Such encoded audio formats include WINDOWS Media Audio (WMA), Motion Picture Experts Group (MPEG) Layer 3 (MP3), and other encoded audio formats. Encoded audio files can be easily transmitted over the Internet and stored in the memory area of a PC Card for future playback. Each MP3 encoded audio file stored on a PC Card contains both audio data and additional data. The additional data identifies and categorizes each file that is stored in the memory of the PC Card. For instance, the additional data can include the title of a song encoded in a digital audio file, the name of the artist of song, the album of the song, the year of the song, a comment regarding the song, and the genre of the song (e.g., blues, classic rock, country, hip-hop, and the like.

Some printers have the capability of reading the memory of a PC Card that was used by a digital camera, or other electronic device, to store digital photography files, digital video files, or digital audio files. With the PC Card input to such a printer, a personal computer is not needed to get a print out of the digital photographs stored in the memory of the PC Card. When one such printer acts as a stand alone device, not in communication with a personal computer or other computing device, the printer lacks a user interface to accept commands for demand printing of the information corresponding to the audio data on the digital audio file, such as any additional information that is stored for each digitally encoded audio file. This is problematic in that, to find out what has been stored on the PC Card, a user must establish communications with a computing device and then use the associated user interface in order to request a print out of a brief table of contents or a short listing of the inventory of files in the memory of the PC Card in order. The subject matter described herein addresses this and other problems with obtaining a printed version of this additional information.

SUMMARY OF THE INVENTION

Inventive methods and systems are described for reading data from a file in a memory of a removable media storage container detected by a removable media storage container reader integrated in a printing device, and printing the data with the printing device, which printing is capable of occurring without a user intervention.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. The same numbers are used throughout the drawings to reference like features and components. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENT

An implementation provides systems and methods for communicating to a printing device via a removable media storage container, where the printing device is in communication with a removable media storage container reader that can be integrated in the printing device. The removable media storage container has a memory in which preformatted audio visual (AV) data of predetermined formatting is stored in one or more files. The AV data of predetermined formatting in the one or more files can be an encoded digital audio, video, or audio-visual (AV) file in the memory of the removable media storage container. Once the removable media storage container reader of the printing device automatically detects the AV data of predetermined formatting in the one or more files, it then accesses and prints a formatted report listing the AV data of predetermined formatting for each of the one or more files. As such, the printing device has the capability of avoiding any user intervention in that a user need only load the removable media storage container into the reader associated with the printing device in order to obtain a printed report from the device that has some or all of the AV data of predetermined formatting in the one or more files. Of course, the printing device may also include the capability of permitting a user to intervene to manually schedule a printing of the formatted report listing the AV data of predetermined formatting for each of the one or more files rather than automatically printing the report.

Another implementation provides systems and methods for a printer having a PC Card reader that, upon insertion of a PC Card into the PC Card reader, prints out a report having a listing for each recognized A-V file, such as an MPEG-3 (MP3) formatted file, that is stored in the memory of the PC Card.

In another implementation, systems and methods for an audio-video (AV) informational support system are described. A network-based AV informational support system provides printer users with additional information about audio and video files that have been stored on a PC card that is read by the printer's PC Card reader. The network-based AV informational support system has a centralized database that maintains additional information of both popular and obscure songs, music videos, pictorial files, and other AV related data. Once a PC Card is manually inserted into a PC Card reader associated with a printer that is in communication with the network-based AV informational support system, the PC Card reader reads the contents of the memory of the PC Card. A processor operatively associated with the printer automatically detects the presence of an audio or video file that has one of several different formats. When so detected, the processor then uses the information stored for each AV file on the PC Card to initiate a request for service over the network to the centralized database of the network-based AV informational support system. Additional information, if available, is returned over the network from the centralized database to the printer initiating the request. The processor then coordinates for its printer the printing of a formatted report. The automatic report contains all or some of the additional information from the centralized database of the network-based AV informational support system. This additional information includes, by way of non-limiting examples, an album cover picture for each recorded song, the artist's fan club information, future concert date schedules for each recording artist detected on the PC Card, the recording studio information of the recorded song, the lyrics of each song recorded in the memory of the PC Card, a coupon from the record company of the artist towards the purchase of other records of the particular artist of the recording or other artists within the same genre that are under the management of the same record company, etc. The printer can be configured to accept or print out only certain types or categories of additional information received back from the network-based AV informational support system.

Thus, to find out what has been stored on the PC Card, a user is not required to establish communications between the printer and a computing device or a network, and then use the user interface associated with the computing device in order to request a print out what AV files have been stored in the memory of the PC Card.

Exemplary File Structure For PC Card Memory Storage

Content providers now use, or will in the future use, file layouts that have fields therein that identify and categorize the content that is stored with an encoded version of the content that they provide, such as music videos, motion pictures, still images, clip art collections, and other AV products. These types of content, which are capable of being stored as files in the memory of a PC Card that are now available or that will in the future become available, utilize file formats that adhere to file layout standards now in existence or that are yet to be developed. These contents and their respective file layouts are contemplated to be within the scope of the invention.

Figure 1:
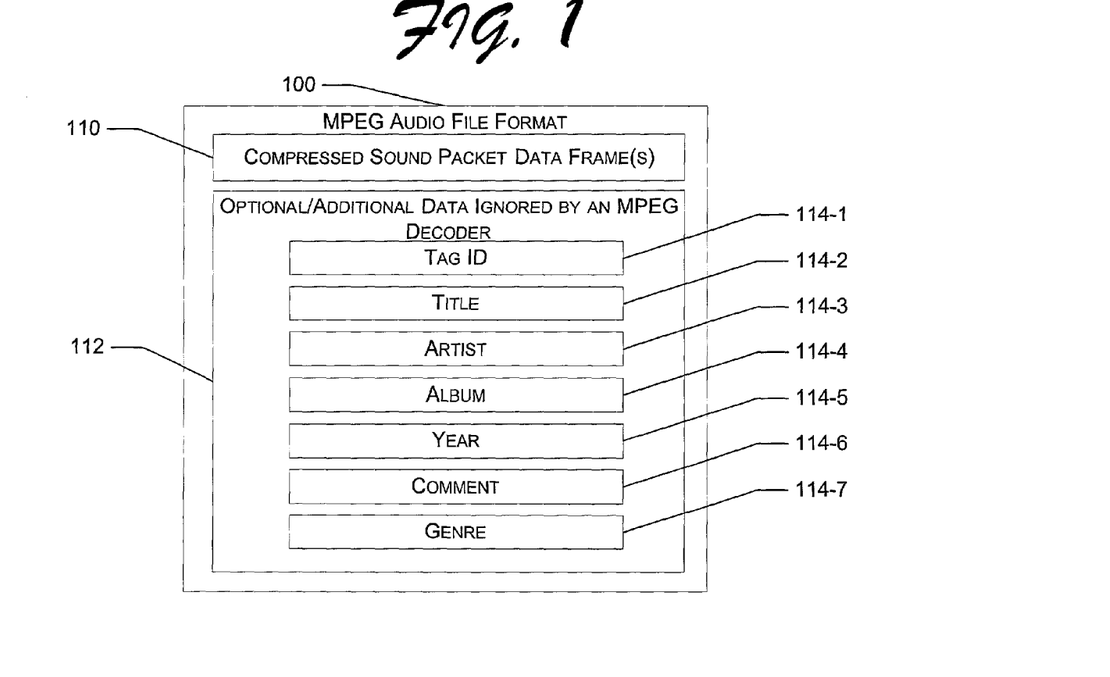
FIG. 1 is a block diagram that shows an embodiment of an MPEG audio file format.
Figure 2:
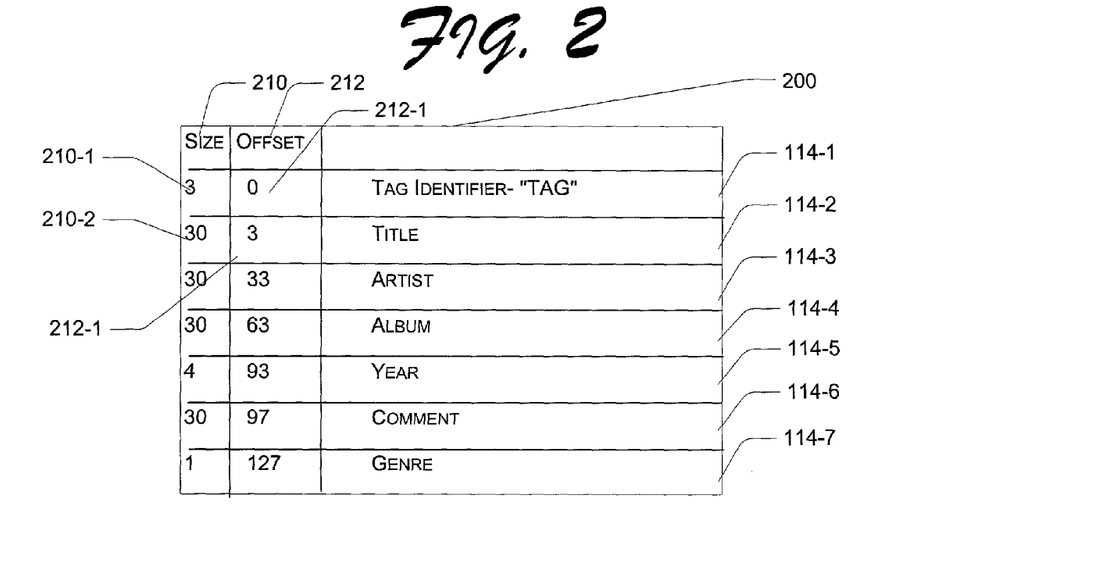
FIG. 2 is a block diagram that shows embodiment of predetermined byte sizes and offsets into an additional set of data that may be placed at the end of an MPEG audio file having the format seen in FIG. 1.

FIGS. 1 and 2 relate to an embodiment of an MPEG audio file layout and the respective fields in such a file layout. FIG. 1 is a block diagram of the layout of an MPEG audio file format 100. The format includes a number of compressed sound packet data frames 110 and a single additional set of data 112. The compressed sound data is the actual encoded digital audio that can be decoded by an MPEG decoder for future playback. An MPEG decoder, when playing an MPEG file, ignores the additional data.

The additional data 112 includes a tag 114-1 that serves as an indicator to an application executing in a processor of the printing device that specific types of ancillary or additional information may be available in the structure. For instance, tag 114-1 could be the three (3) characters "TAG", although other characters in successive versions of AV files could also be used as they are released to the public domain. Those skilled in the art would recognize these as current standards and are not considered to be limiting. Additional information includes a title 114-2, an artist indication 114-3, an album indication 114-4, a year indication 114-5, a comment field 114-6, and a genre indication 114-7 (e.g., blues, classic rock, country, contemporary religious, and the like). The size of this additional data is by the MPEG predetermined AV format standards to be one-hundred-and-twenty-eight (128) bytes long. Thus, each respective additional information item 114-1 through 114-7 has a predetermined byte-size that is located at a predetermined offset within the structure.

FIG. 2 is a block diagram layout of an embodiment of an MPEG audio file format 200 that shows predetermined byte sizes and offsets into the additional set of data 112 of FIG. 1 that may be placed at the beginning or end of the MPEG audio file 100. Column 210 provides the respective byte-size for each respective value 114 of the additional data 112. Column 212 provides the respective offset number of bytes from the beginning of the additional data 112 so that an application can locate a particular value within the additional data 112. For example, byte-size indication 210-1 and offset indication 212-1 reserve the first three (3) bytes for a tag indication 114-1 (offset of "0"). Whereas, size indication 210-2 and offset indication 212-2 reserve the next thirty (30) bytes for a title indication. Other entries in columns 210, 212 are structures similarly. While the audio file typically includes a musical recording, the additional data includes the title of the musical recording, an artist indication, an album indication, a year indication, a comment field, and a genre indication.

Exemplary Printer Architecture

Figure 3:
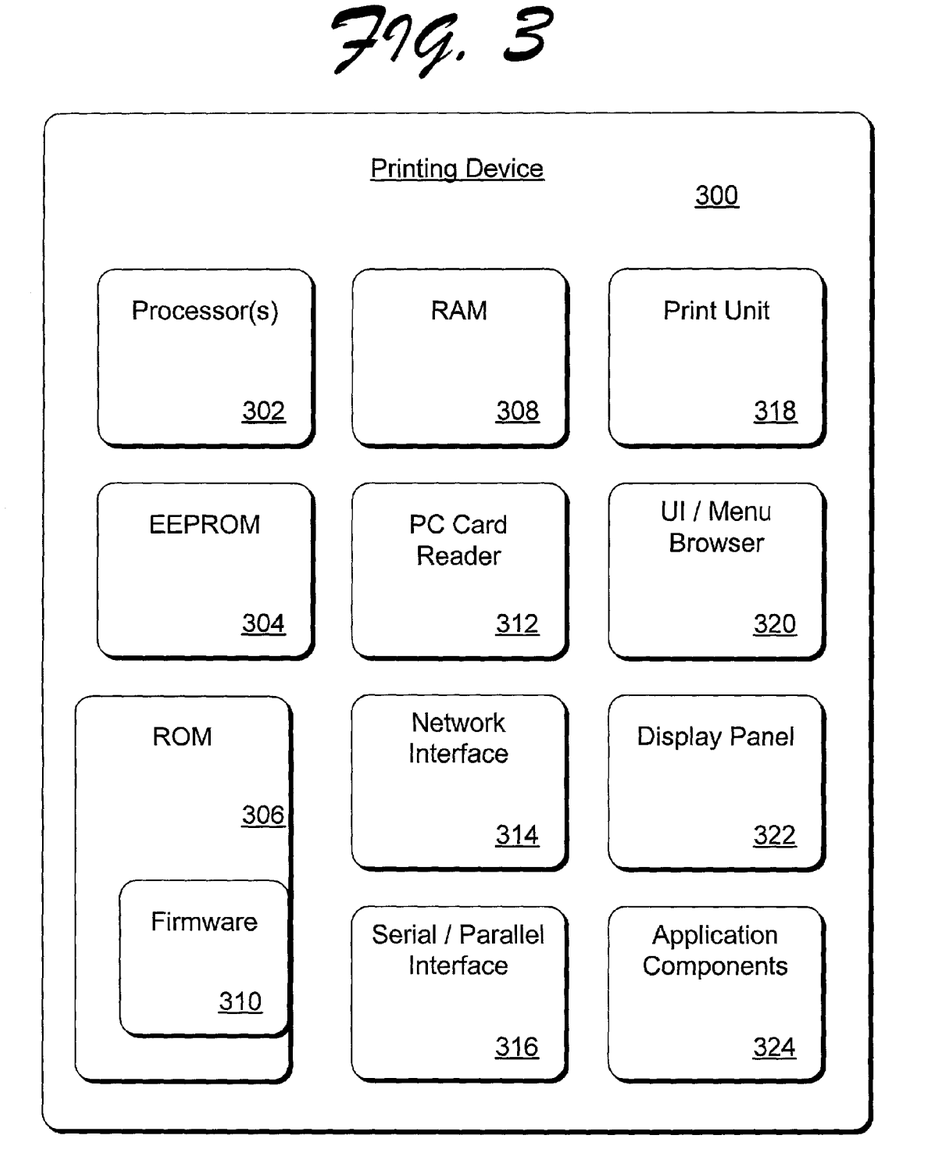
FIG. 3 is a block diagram that illustrates various components of an exemplary printing device.

FIG. 3 illustrates various components of an exemplary printing device 300 that can be utilized to implement the inventive techniques described herein. Printer 300 includes one or more processors 302, an electrically erasable programmable read-only memory (EEPROM) 304, ROM 306 (non-erasable), and a random access memory (RAM) 308. Although printer 300 is illustrated having an EEPROM 304 and ROM 306, a particular printer may only include one of the memory components. Additionally, although not shown, a system bus typically connects the various components within the printing device 300.

The printer 300 also has a firmware component 310 that is implemented as a permanent memory module stored on ROM 306. The firmware 310 is programmed and tested like software, and is distributed with the printer 300. The firmware 310 can be implemented to coordinate operations of the hardware within printer 300 and contains programming constructs used to perform such operations.

Processor(s) 302 process various instructions to control the operation of the printer 300 and to communicate with other electronic and computing devices. The memory components, EEPROM 304, ROM 306, and RAM 308, store various information and/or data such as configuration information, fonts, templates, data being printed, and menu structure information. Although not shown, a particular printer can also include a flash memory device in place of or in addition to EEPROM 304 and ROM 306.

Printer 300 also includes a PC Card reader 312, a network interface 314, and a serial/parallel interface 316. PC Card reader 312 provides additional storage for data being printed or other information maintained by the printer 300. Network interface 314 provides a connection between printer 300 and a data communication network. The network interface 314 allows devices coupled to a common data communication network to send print jobs, menu data, and other information to printer 300 via the network. Similarly, serial/parallel interface 316 provides a data communication path directly between printer 300 and another electronic or computing device. Although printer 300 is illustrated having a network interface 314 and serial/parallel interface 316, a particular printer may only include one interface component.

Printer 300 also includes a print unit 318 that includes mechanisms arranged to selectively apply ink (e.g., liquid ink, toner, etc.) to a print media such as paper, plastic, fabric, and the like in accordance with print data corresponding to a print job. For example, print unit 318 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner.

Print unit 318 can also be configured to support duplex printing, for example, by selectively flipping or turning the print media as required to print on both sides. Those skilled in the art will recognize that there are many different types of print units available, and that for the purposes of the present invention, print unit 318 can include any of these different types.

Optionally, printer 300 also includes a user interface and menu browser 320, and a display panel 322. The user interface and menu browser 320 allows a user of the printer 300 to navigate the printer's menu structure. User interface 320 can be indicators or a series of buttons, switches, or other selectable controls that are manipulated by a user of the printer. Display panel 322 is a graphical display that provides information regarding the status of the printer 300 and the current options available to a user through the menu structure.

Printer 300 can, and typically does include application components 324 that provide a runtime environment in which software applications or applets can run or execute. One exemplary runtime environment is a Java Virtual Machine (JVM). Those skilled in the art will recognize that there are many different types of runtime environments available. A runtime environment facilitates the extensibility of printer 300 by allowing various interfaces to be defined that, in turn, allow the application components 324 to interact with the printer.

When a user inserts a PC Card manually into the PC Card reader 312, processor 302 executes a program that reads the PC card. The program can be stored in firmware 310 or in application components 324. The program then verifies that an AV file of one of a predetermined set of formats is stored in the memory of the PC Card. If such an AV file is in the memory of the PC Card, then the program is capable of coordinating the automatic printing of a report of the additional information stored with the AV file in a predetermined formatted report. An example of the information in the formatted report is contained in the additional data 112 seen in FIG. 1, and includes title 114-2, artist indication 114-3, album indication 114-4, year indication 114-5, comment field 114-6, and genre indication 114-7. The program uses the predetermined offsets of this structure as seen in FIG. 2 to process these AV data fields. The user can then store the paper report in a catalog location for future reference.

The program can also have the capability of permitting a user to intervene to manually schedule a printing of the predetermined formatted report rather than automatically printing the report. This optional user intervention can be made using the series of buttons, switches, or other selectable controls that are manipulated by a user of the printer via he user interface 320.

A typical AV file might contain a song that was downloaded to device that writes to the memory of the PC card. Examples of such devices include digital cameras, Personal Digital Assistants (PDAs), electronic musical instruments, voice recorders, faxes, printers, scanners, word processors, handy terminals, portable digital audio music players such as a Diamond RIO® player, and/or the like. A digital still camera can store digital photographs on the PC Card. As such, the PC Card is a digital film for the digital camera. Certain digital cameras can store both video and audio files on the PC card.

In another implementation, a removable media storage container that is read by the printer can be magnetic tape on a reel that can be loaded into a reel-to-reel drive associated with the printing device, a compact disk bearing magneto-optically stored AV files, or a computer chip with semiconductive memory having AV files stored therein. A removable media storage container having moving parts can also be read by the printer, such as a digital audio magnetic tape cartridge, a diskette or a larger capacity disk such as is made available as a ZIP™ disk by the Iomega Corporation of Utah. In another implementation, the removable media storage container is a PC Card that is less than about the size of a credit card and conforms to the Personal Computer Memory Card Industry Association (PCMCIA) standards. By way of non-limiting example, the PC Card can be a SmartMedia™ card. Another type of PC Card in another implementation is the Miniature Card™. Other examples of PC Cards include compact flash cards, the PocketZip™ by the Iomega Corporation of Utah, and Memory Stick™ by the Sony Corporation.

PC cards of the latter implementations are advantageous in that have they 'plug-and-play' capability. As such, they can be inserted into or removed from the PC card reader 312 while the printer 300 is on because power and ground contact pins of the PC card are the longest contacts, ensuring that disconnect signals disengage first, preserving data integrity.

The relatively low cost of these PC Cards permits the user to have many cards to store a large library of images and sounds (AV) from different portable devices that record data on the PC Cards in a variety of formats using different audio encoding algorithms. Audio encoding algorithms are used to digitally encode and compress music into encoded audio formats at near-CD quality. Such encoded audio formats include WINDOWS Media Audio (WMA), Motion Picture Experts Group (MPEG) Layer 3 (MP3), and other encoded audio formats. Encoded audio files can be easily transmitted over the Internet and stored in an on-line music library, a computer, a portable digital audio music player such as a Diamond RIO® player, and/or the like, for future playback.

A format used for audio and video encoding is the MPEG-4 standard, which is a graphics and video standard designed to transmit video and images over a bandwidth that can mix video with text, graphics and 2-D and 3-D animation layers. MPEG-4 is a logical standard for video telephony usage. The present invention is intended to encompass all known and future AV file formats.

Exemplary AV Informational Support System

Figure 4:
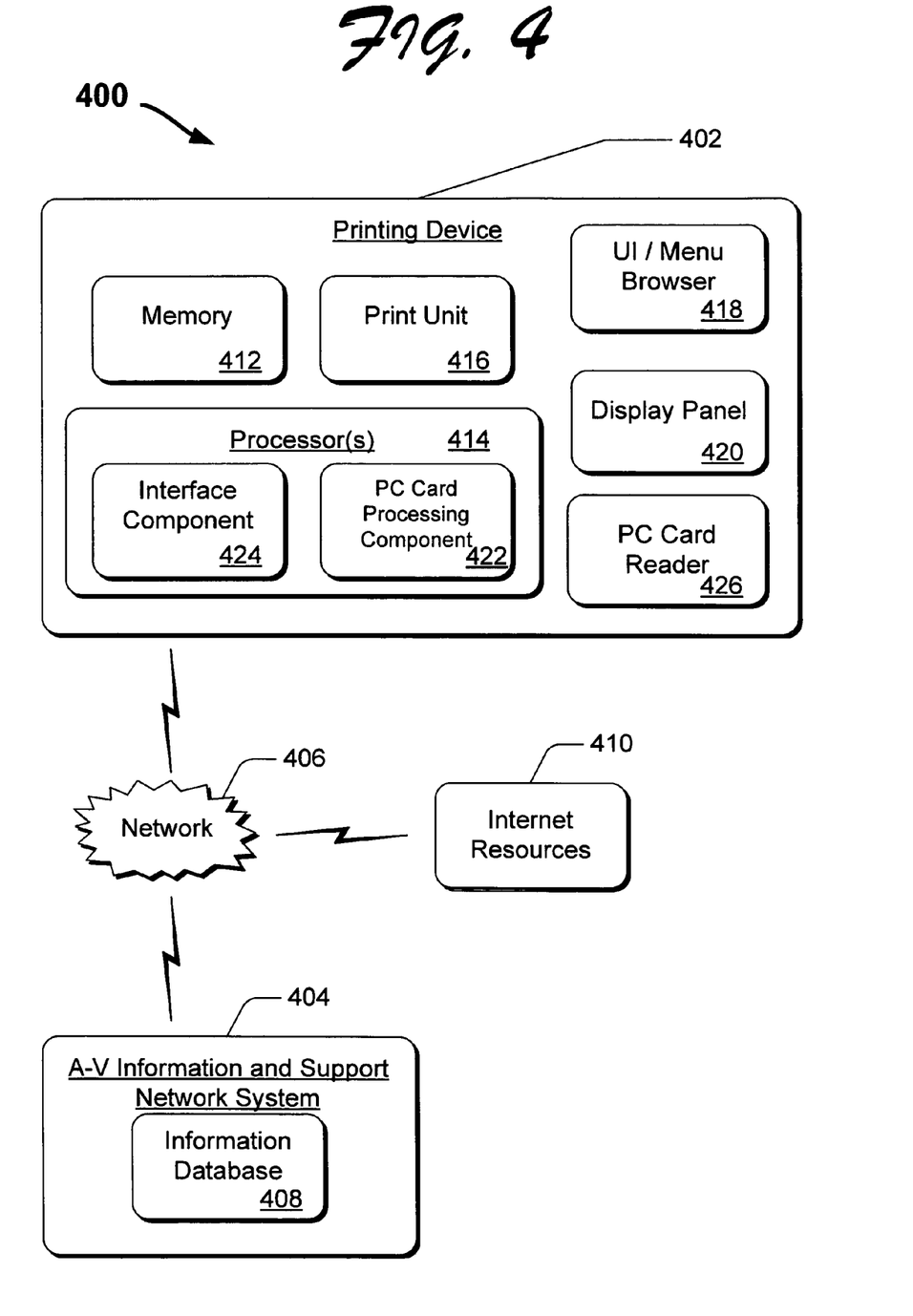
FIG. 4 is a block diagram that illustrates components of an audio-visual (AV) informational support system in an exemplary network environment.

FIG. 4 illustrates components of a network environment 400 in which a printing device 402 is connected with an AV informational support system 404 via a network system 406. The printing device 402 can include one or more of the components of the exemplary printing device 100 seen in FIG. 1, particularly a PC Card reader 426 that corresponds to PC Card reader 112. The printing device 402 can be implemented as a stand alone device, such as multifunction device that prints, faxes, scans, and/or copies. Additionally, printing device 402 is configured to communicate directly with the AV informational support system 404, and without an interconnected personal computer.

The AV informational support system 404 has an AV information database 408 that maintains AV information. Those skilled in the art will recognize that the AV information database 408 can include, or be implemented with, one or more of the components of a computing device, appliance server, and the like. Furthermore, the AV information in AV information database 408 can be implemented with more than one computing devices in a distributed network environment.

The network system 406 can be any type of network, such as a local area network (LAN) or a wide area network (WAN), wired or wireless, and uses any type of network topology and any network communication protocol. Although only a few devices are shown interconnected via network system 406, a typical network system can have any number of devices connected to it, either directly or indirectly, via another network system. The Internet, having any number of Internet resources 410, is an example of multiple connected network systems each having multiple devices. The printing device 402 and the AV informational support system 404 can also have modems and/or network cards that facilitate network communication and data transfer via network system 406.

The printing device 402 includes a memory component 412 which can be implemented with an EEPROM 104, ROM 106 with firmware 110, and /or RAM 108. Each of these memory components is described above with respect to the exemplary printing device 300 (FIG. 3). The printing device 402 also includes one or more processors 414, a print unit 416, a user interface and menu browser 418, and a display panel 420. Each of these components is also described above with respect to the exemplary printing device 300 (FIG. 3). It is to be appreciated, however, that printing device 402 can be implemented with only some of the illustrated components. For example, printing device 402 can be implemented in the network environment 400 without a user interface and menu browser 418, and without a display panel 420.

The printer memory 412, which can contain firmware as described above, maintains a PC Card processing component 422 that executes on processor 414. The PC Card processing component 422 monitors the operations and functions of the PC Card reader 426 of the printer 402 to determine if a PC Card has been manually inserted into PC card reader 426. If a PC Card has been manually inserted into PC card reader 426 of the printer 402, the printer 402 can initiate communications with the AV informational support system 404 via the network system 406 and provide information about the AV files that are stored on the PC Card, as processed by PC Card processing component 422. One function of the PC Card processing component 422 is to determine whether files stored on the PC Card have one or more of a predetermined AV file format, and if so, whether the respective formats thereof are supported by the AV information and support network system 404.

The printer 402 can communicate with the AV informational support system 404 via login access over the Internet, via a modem, or via an email system. The manufacturer of the printer 402, or of any other electronic or computing device, can include email information and logon passwords within the device firmware, for example, when the device is manufactured to facilitate the device being able to contact and establish communications with remote sites on a network. Those skilled in the art will recognize that these examples of network communication are only a few of the many possible ways to access an information database in a computing system architecture via a network system.

When the PC Card processing component 322 determines that a PC Card having AV files stored thereon of the requisite format has been inserted into PC Card reader 426 of printer 402, an interface component 424 that executes on processor 414 sends information and data pertaining to each respective eligible AV file directly to the AV informational support system 404 for retrieval of additional information according to a preconfiguration of preferred information for the printer 402.

An alternative to the printer 402 initiating contact with the AV informational support system 404 is that the printer can notify a user of the printer that no information about an AV file stored on an insert PC Card is available so that the user can initiate the retrieval of information from other sources. The printer 402 can notify the user via a printed report or via the user interface and menu browser 418 on the display panel 420. An advantage to having the printer 402 contact and communicate with the AV informational support system 404 directly is that there is less chance of an error when translating the information and data pertaining to any recognized or determined additional information already stored on the PC card that is associated with a particular AV file.

The AV informational support system 404 compares any received information and data pertaining to the AV file stored on the PC Card that caused the request to be made to determine if there is information available that is related to the AV file. The AV information maintained by information database 408 may include options for still further information that the user may wish to retrieve if configuration of the printer 402 does not allow or is configured to disallow the printing of all of the AV information that is available.

If additional AV information is available for a particular AV file stored on a PC Card, the AV informational support system 404 returns the information pertaining to the AV file for download to the printer 402. Additionally, the AV informational support system 404 can evaluate the information and data submitted by the printer 402 to determine if more AV related information are available. If available, the AV informational support system 404 can send the information back to the printer 402 along with available information already permitted by the configuration of the printer. The user can then decide, based upon prompts provided to the user by printer 402 upon UI/Menu Browser 418, whether or not to print out the additional AV information. As such, the user has different ways of preventing unwanted AV information (e.g. 'spam') from being printed out.

The AV informational support system 404 can send information to printer 402 to direct the device to access Internet resources 410 to obtain any available system or device updates to the AV file data reporting system. This can involve updating firmware or software drivers within the printer 402. A solution can also involve updating writeable memory in the printer 402 with help menus, warnings, and/or error messages, for example, to provide a user with the latest available AV file data reporting system support information for the printer 402.

Data received from the AV informational support system 404 by the printer 402 is automatically printed out by the printer 402 on a printed page with the print unit 416, which may include further instructions or as instructions or messages displayed on the display panel 420 that can be follow up upon by a user, off line.

The printer 402 does not have to be connected to a personal computer to facilitate the described AV information transactions between the printer and the AV informational support system 404. The printer 402 has the capability to contact the AV informational support system 404 directly and coordinate the information exchange without user intervention. Alternatively, the user interface and menu browser 418 can have a "hot button", that when depressed by a user, initiates in the printer the undertaking of specific functions particularly directed to the retrieval of data for a report that is printed that is of or relating to AV data read by the reader of the printer, such as Internet retrieval functions.

Methods for an AV Informational Reporting System

Figure 5:
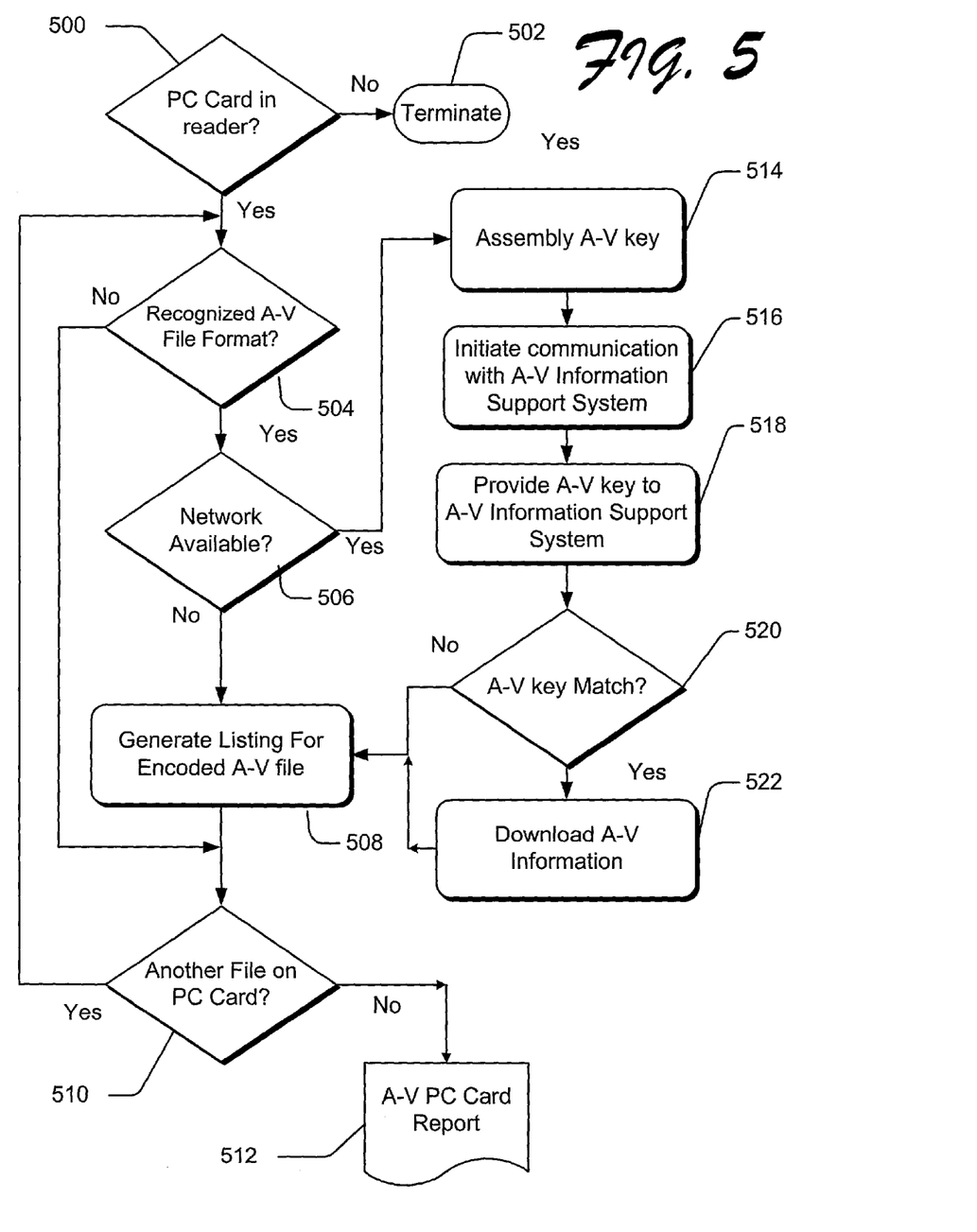
FIG. 5 is a flow diagram that describes an embodiment of a method for an audio-visual (AV) informational support system.

FIG. 5 illustrates a method of an embodiment for an AV informational reporting system executing within a printer, such as printing device 300 in FIG. 3 or printing device 402 in FIG. 4. The order in which the method is described is not intended to be construed as a limitation. Furthermore, the method can be implemented in any suitable hardware, software, firmware, or combination thereof.

Figure 6:
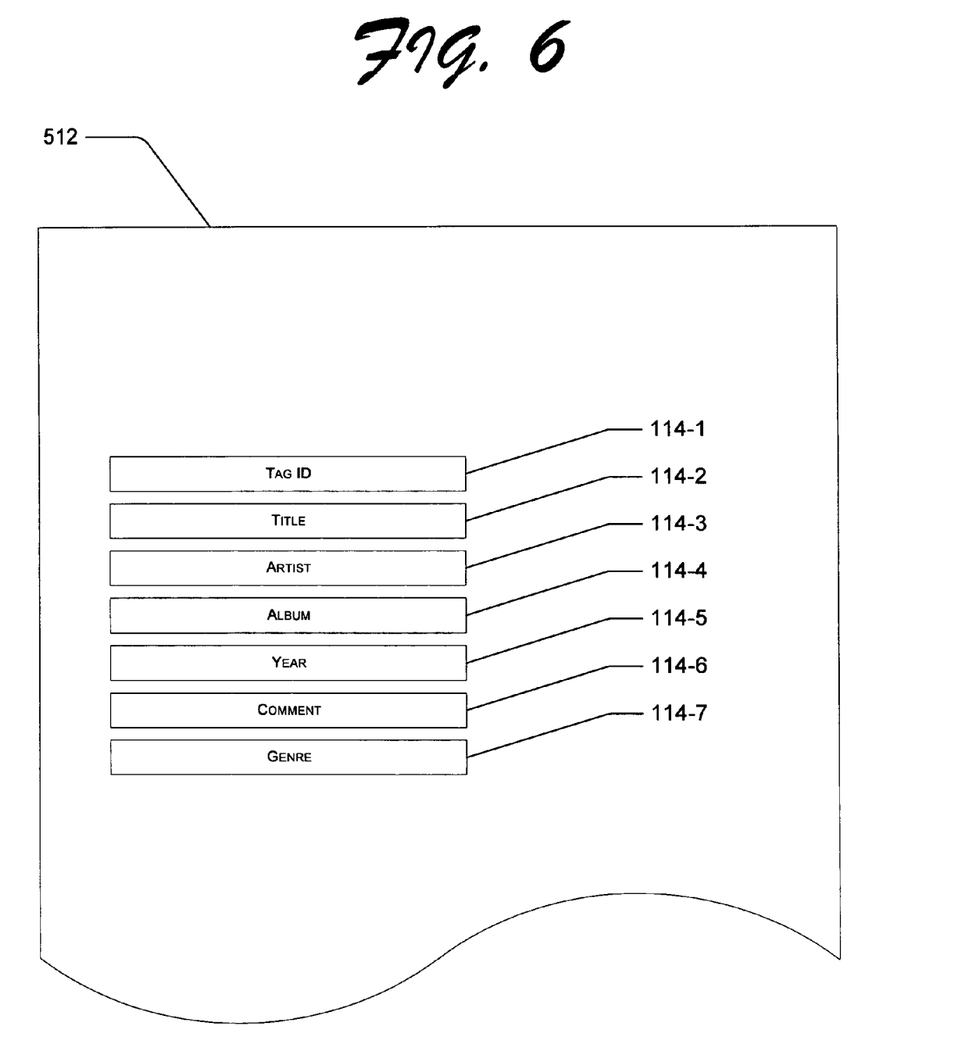
FIG. 6 illustrates a sample report, according to an embodiment.

At block 500, a removable media storage container reader associated with the printer, such as the PC Card reader 332 in FIG. 3 or the PC Card reader 426 in FIG. 4, determines whether a removable media storage container, such as a PC Card, has been manually inserted and is available for reading. If not, the process terminates at block 502. If there is a PC Card in the PC card reader, then at block 504, the printer determines whether there is a file that is stored in the memory of the PC Card that has a format that is a recognized audio-visual (AV) format. The predetermined or recognized AV file formats can be stored in a memory area associated with the printer. If a file in the PC Card memory has a recognized AV file format, then the printer determines whether access to a network is available at block 506. By way of example, the network can be the network 406 seen in FIG. 4 that is accessed by the printer through interface component 424. With respect to FIG. 3 a network interface 314, in conjunction with user interface/menu browser 320, performs a similar function. If network access is not available, then a listing is generated at block 508 from additional information that is stored with the encoded AV file on the PC Card according to the recognized AV file format. By way of example, the generated listing may contain the data seen in FIG. 1, reference numerals 114-2 through 114-7; also, see. e.g., FIG. 6 which illustrates a sample report 512, according to an embodiment.

At block 510, the printer determines whether there are any more files that are stored in the memory of the PC Card. If not, then the printer prints out a report listing any information that was generated at block 508 for AV files that are stored on the PC Card that was detected in the PC Card reader associated with the printer.

At block 504, if a file on the PC Card does not have a recognized AV file format, then the next file in the memory is examined for its format at block 510. If there are no more files in the memory of the PC Card that have a recognized AV file format, then the program executing in the printer terminates after printing at block 512 a report generated at block 508 of the AV information accumulated during the execution of the program.

If the network is determined to be available at block 506, a key is assembled at block 514 from the additional information that is stored with the encoded AV file on the PC Card according to the recognized AV file format. By way of example, the key can be assembled from the data see in FIG. 1 at reference numerals 114-1 through 114-7. Communication with the network is established at block 516 and the assembled key is supplied to the AV Information Support System at block 518. The key can also include information to access a remote site on the network, such as a universal resource locator (URL) or a direct dial-up telephone number to access a content provider, such as a server, on the network. The comment field 114-6, seen in FIG. 1, may contain a URL, a direct dial-up telephone number, an email address, the entire key, or other data helpful to assist in locating and retrieving information about an encoded AV file from a remote site on the network.

The AV Information Support System uses the key to locate information on the network, such as in information database 408, that is of or relating to an encoded AV file that is stored in the memory of the PC Card that has been manually inserted into the printer's PC Card reader. If a match for the key is found in the AV Information Support System at block 520, the information associated with the key is downloaded on the network at block 522 for use in generating a report for the AV file at block 508. If no match for the key was found at block 520, then the program proceeds to block 508 for the generating a report for the AV file that contains some, all, or optionally none of the additional information that is stored with the encoded AV file on the PC Card according to the recognized AV file format.

The report that is printed at block 512 may contain as much information that is available about each recognized AV formatted file in the memory of the PC Card that is manually inserted into the printer's PC Card reader. By way of example, the report may contain, for each such AV file, a listing of the lyrics of each song recorded in the memory of the PC Card, an album cover picture for each recorded song, the artist's fan club information, future concert date schedules for each recording artist detected on the PC Card, the recording studio information of the recorded song, a coupon from the record company of the artist towards the purchase of other records of the particular artist of the recording or other artists within the same genre that are under the management of the same record company, etc. The printer can be configured, such as through use by a user of the user interface/menu browser 320 seen in FIG. 3, to accept or print out only certain types or categories of additional information received back from the network-based AV informational support system.

An AV informational support system facilitates both printer users and AV content providers. A networked printer can self-determine if more information is available for AV files stored on a removable media storage container that is read by a reader associated with the printer. Additionally, the networked printer does not have to be connected to a personal computer to accomplish such derivation of additional information regarding the AV files on the PC Card.

The described system provides up-to-date information about AV files without the need for user interaction with the printer, other than to manually insert the removable media storage container into the printer's reader, and without the need for customer service personnel to provide such up-to-date information about the AV files.

The exemplary methods for an AV Informational Reporting System described above with respect to FIG. 5 can be implemented in a printer, such as printing devices 300, 402, respectively in FIGS. 3 and 4, in a variety of ways. One such way is a hardware solution that utilities a digital signal processor (DSP). Another way is a software solution that can utilize reduced instruction set computer (RISC) chips, such an ARM processor from ARM Inc., Los Gatos, Calif., in conjunction with printer-housed internal software.

The hardware solution integrates with known hardware frameworks, and is an "off the shelf" solution that can be an all-in-one application specific integrated circuit (ASIC) chipset. The ASIC chipset may be a single DSP chip of conventional architecture that performs a decoding function for an A-V file, such as MPEG-3 format decoding. The single DSP chip is relatively inexpensive, has a conventional architecture, does 12, 16 and 24-bit conversion, and readily does MPEG-3 format decoding. Some DSPs of this nature are not upgradeable, particularly with respect to newer codecs/formats/algorhithms for A-V formatted files.

Alternatively, the software solution can be achieved using one or more RISC chips that are programmed to capture whatever is given to them from a buss in communication with the RISC chips. RISC chips are desirable in that they can be energy efficient, have an architecture of 32-bits, can be programmed to decode A-V formats including MPEG-1 through MPEG-3 as well as WINDOWS® Media Audio (WMA), and they are reprogrammable and upgradeable to newer codec standards.

The ability to upgrade the hardware and/or software solutions are desirable in that there is a general expectancy that future A-V formatting standards will be progressive in the area of both audio and digital. By way of example, the MPEG-4 format standard can be used in a video telephony environment. Accordingly, an implementation of the systems and methods disclosed herein contemplate the ability to printout one or more video frames that are encoded in a video telephony storage format for files that are stored in the memory of a removable media storage device that is read by the printer.

The present invention may be embodied in other specific forms without departing from its spirit or essential characteristics. Although the invention has been described in language specific to structural features and/or methodological steps, it is to be understood that the invention defined in the appended claims is not necessarily limited to the specific features or steps described. All changes which come within the meaning and range of equivalency of the claims are to be embraced within their scope.

What is claimed is:

1. A method, comprising:
inserting a PC Card in a PC Card reader integrated in a printing device;
retrieving data from a file in a memory of the PC Card that is in an AV predetermined format, the file comprising compressed audio data and other data;
assembling a key from the other data;
establishing direct communication between the printing device and an AV information support system;
supplying the key to the AV information support system directly from the printing device and, with the AV information support system, locating information identified by the key;
downloading the information identified by the key directly to the printing device without communication of the printing device with an interconnected computing device; and
printing a report with the printing device utilizing the downloaded information.

2. The method as recited in claim 1, wherein downloading the information further comprises accessing a remote site and determining if the key is matched at the remote site in order to download the information.

3. The method as recited in claim 1, wherein downloading the information further comprises accessing a telephone number of a remote access site in the key and utilizing the telephone number to locate and download the information.

4. The method as recited in claim 1, wherein downloading the information further comprises accessing a universal resource locator (URL) in the key and utilizing the URL to locate and download the information.

5. A computer-readable medium comprising computer-executable instructions to perform a method as recited in claim 1.

6. The method as recited in claim 1, wherein assembling a key further comprises transmitting the key from the printing device to a remote site, and wherein downloading the information further comprises downloading the information identified by the key directly to the printing device from the remote site without communication of the printing device with an interconnected computing device.

7. The method as recited in claim 1, wherein the AV predetermined format includes one of an encoded audio format, an encoded video format, an encoded audio-video format, a WINDOWS Media Audio (WMA) format and a Motion Picture Experts Group (MPEG) format.

8. The method as recited in claim 1, wherein the audio data includes a musical recording, and the other data includes one of a title, an artist indication, an album indication, a year indication, a comment field, and a genre indication of the musical recording.

9. The method as recited in claim 1, wherein said printing occurs without user intervention.

10. The method as recited in claim 1, further comprising:
generating a listing from the other data; and
printing a report of the listing with the printing device,
wherein generating the listing and printing the report occur without communication of the printing device with an interconnected computing device.

11. A method, comprising:
detecting insertion of a removable memory in a removable memory reader integrated in a printing device;
recognizing an AV file stored on the removable memory;
assembling a key from data stored with the AV file on the removable memory;
transmitting the key over a network to an AV information support system directly from the printing device;
using the key by the AV information support system and locating information on the network associated with the AV file;

downloading the information associated with the AV file directly to the printing device over the network without an interconnected computing device; and printing at least a portion of the information associated with the AV file with the printing device.

12. The method of claim 11, wherein the removable memory includes a PC Card, and the removable memory reader includes a PC Card reader integrated in the printing device.

13. The method of claim 11, wherein the key includes a universal resource locator (URL) identifying a location on the network of information associated with the AV file.

14. The method of claim 11, wherein a format of the AV file includes one of an encoded audio format, an encoded video format, an encoded audio-video format, a WINDOWS Media Audio (WMA) format, and a Motion Picture Experts Group (MPEG) format.

15. The method of claim 11, wherein the AV file includes an audio file of a musical recording, and the data stored with the AV file includes one of a title, an artist indication, an album indication, a year indication, a comment field, and a genre indication of the musical recording.

16. The method of claim 11, wherein the printing of the at least a portion of the information associated with the AV file occurs without user intervention.

17. The method of claim 11, further comprising:

generating a listing from the data stored with the AV file; and printing a report of the listing with the printing device, wherein generating the listing and printing the report occur without an interconnected computing device.

* * * * *